(12) United States Patent
Welch et al.

(10) Patent No.: US 8,322,653 B2
(45) Date of Patent: Dec. 4, 2012

(54) HYBRID BEAM FOR A THRUST REVERSER UNIT

(75) Inventors: John M. Welch, Wichita, KS (US); Henry A. Schaefer, Wichita, KS (US); Matthew Scott Tymes, Wichita, KS (US); Michael Urban, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 594 days.

(21) Appl. No.: 12/558,042

(22) Filed: Sep. 11, 2009

(65) Prior Publication Data
US 2011/0062279 A1 Mar. 17, 2011

(51) Int. Cl.
*F02K 1/54* (2006.01)

(52) U.S. Cl. .............. 244/110 B; 244/54; 60/226.2; 239/265.25

(58) Field of Classification Search .............. 244/110 B, 244/53 R, 12.5, 23 D, 119, 117 R, 131, 54, 244/129.5, 129.4, 129.1; 52/834, 843, 844, 52/848; 60/226.2, 230; 239/265.29; 248/4.1, 248/230.1, 230.4, 231.51, 216.5
See application file for complete search history.

(56) References Cited

U.S. PATENT DOCUMENTS

| | | | | |
|---|---|---|---|---|
| 5,239,822 | A * | 8/1993 | Buchacher | 60/226.2 |
| 6,824,101 | B2 * | 11/2004 | Sternberger et al. | 244/110 B |
| 6,915,984 | B2 * | 7/2005 | Sternberger et al. | 244/110 B |
| 8,136,341 | B2 * | 3/2012 | Stephan et al. | 60/226.2 |
| 2003/0024236 | A1 * | 2/2003 | Lymons et al. | 60/226.2 |
| 2004/0159741 | A1 * | 8/2004 | Sternberger et al. | 244/110 B |
| 2007/0294996 | A1 * | 12/2007 | Stephan et al. | 60/226.2 |

* cited by examiner

*Primary Examiner* — Tien Dinh
*Assistant Examiner* — Michael A Fabula
(74) *Attorney, Agent, or Firm* — Hovey Williams LLP

(57) ABSTRACT

Latch beams and hinge beams of an aircraft thrust reverser and a method for manufacturing the beams. The latch and hinge beams may comprise a plurality of hollow composite tubes joined with a plurality of machined metal fittings in alternating succession. The metal fittings may comprise at least one of hinge fittings and latching fittings. The latch and hinge beams may further comprise slider tracks configured to slidably attach to a translating sleeve of the thrust reverser. The hinge beams may each be rotatably attached to an engine strut or pylon of the aircraft, and the latch beams may each be mechanically latched with each other. Each of the latch and hinge beams may also be fixedly attached to an inner engine cowling of the thrust reverser.

14 Claims, 9 Drawing Sheets

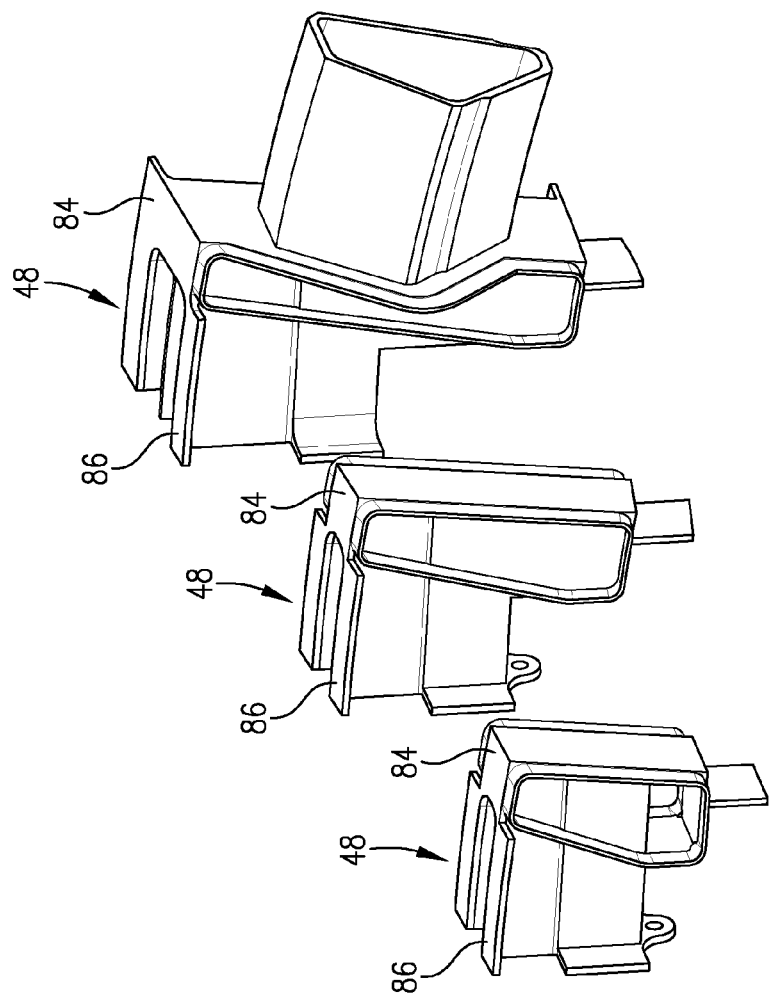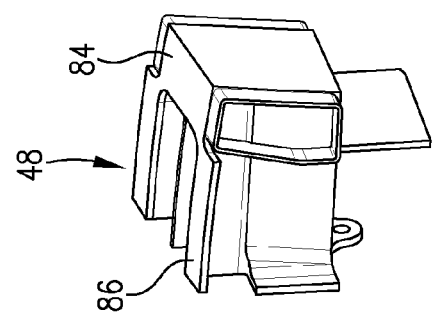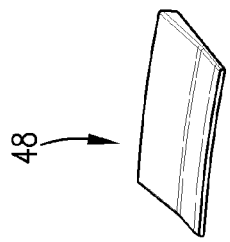
FIG. 8

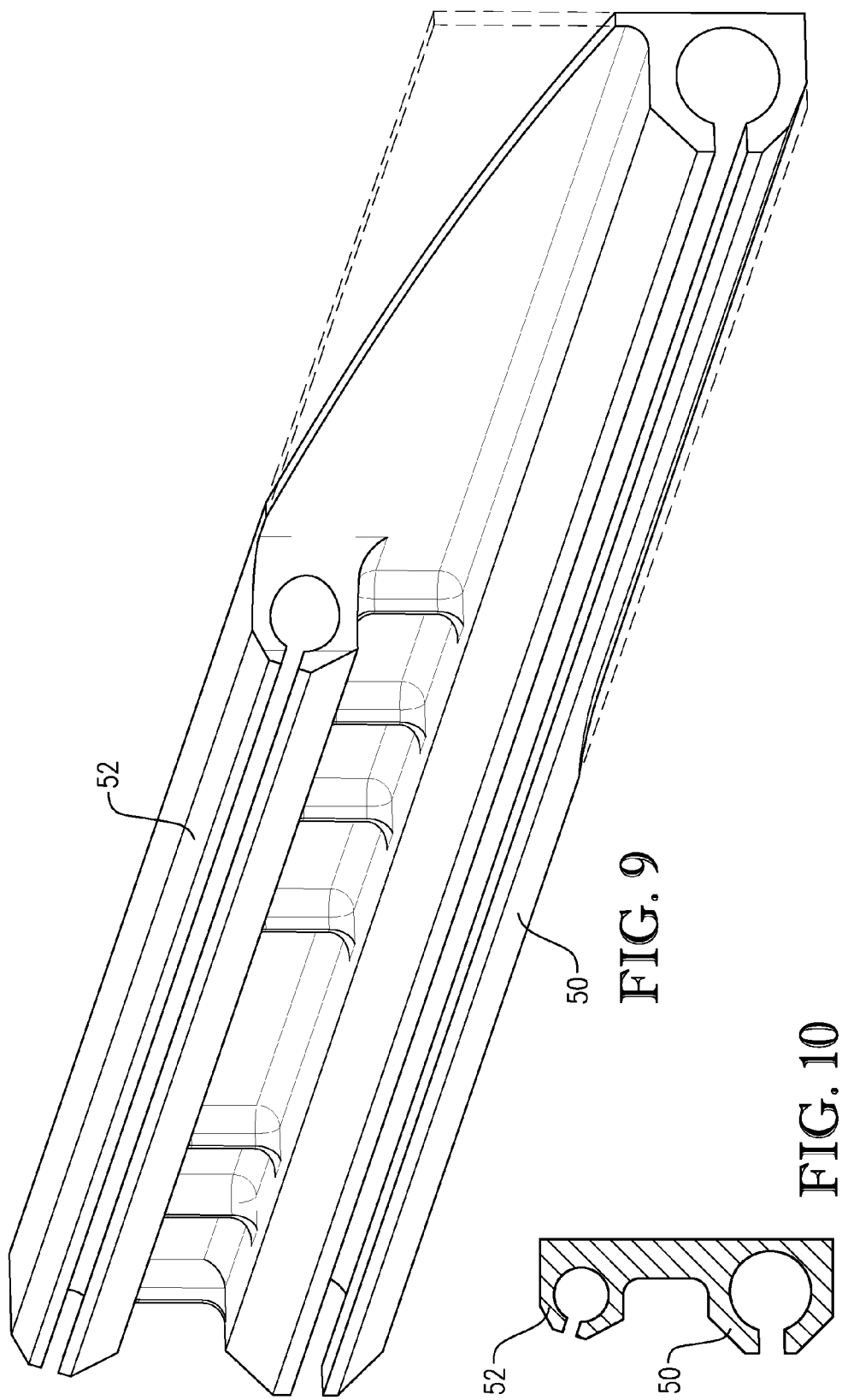

HYBRID BEAM FOR A THRUST REVERSER UNIT

BACKGROUND

1. Field

The present invention relates to aircraft components. More particularly, the invention relates to composite and metal hybrid beams and a method of constructing and installing the hybrid beams within a thrust reverser.

2. Related Art

Latch beams and hinge beams join two halves of an aircraft thrust reverser with each other and with an engine strut or pylon. These beams are traditionally cast or machined as a monolithic metal beam or metal build up assemblies. Unfortunately, machined metal beams are quite heavy and expensive. Additionally, 5-axis or 6-axis machines, which are quite expensive, are typically required to machine these metal beams.

Latch and hinge beams using lighter composite materials have been developed, but their beams still require stiffening and attach lugs like those used on comparable metal beams, are costly, require intricate fabrication details, and are difficult to inspect. Furthermore, composite lugs and slider tracks of these beams are problematic during operation due to the large load that they are configured to bear. Therefore, replacement of the monolithic metal beam structures with composite alternatives has had little or no success.

Accordingly, there is a need for latch and hinge beams that overcome the limitations of the prior art.

SUMMARY

The present invention provides hybrid hinge and latch beams and a method for constructing and installing the hybrid hinge and latch beams onto a thrust reverser of an aircraft. The hinge beams and latch beams of the present invention are constructed of a plurality of hollow composite tubes joined in alternating succession with a plurality of metal fittings. The metal fittings may be hinge fittings for rotatably attaching to a strut or pylon of the aircraft or latch fittings for latching with other latch fittings of another one of the latch beams. The metal fittings may mate with an inner surface of the composite tubes and may be bonded and mechanically fastened to the composite tubes.

The hinge beams and the latch beams may each also comprise one or more slider tracks configured to slidably attach to a translating sleeve of the thrust reverser, such that the translating sleeve may slide aft along the latch and hinge beams to deploy the thrust reverser.

A method for manufacturing and installing at least one beam of a thrust reverser may comprise forming a hollow tube of composite material and dividing the hollow tube into a plurality of composite tubes. The method may further comprise forming a plurality of metal fittings, such as latch fittings and hinge fittings, and forming the beam by joining the metal fittings with the plurality of composite tubes in alternating succession.

The method may also comprise attaching slider tracks to the beam and slidably attaching the beam to a slider of a translating sleeve of the thrust reverser. Finally, the method may comprise fixedly attaching the beam to an inner engine cowling of the thrust reverser, rotatably attaching the beam to an engine strut or pylon of the aircraft; and/or mechanically latching the beam with another beam of the thrust reverser.

These and other important aspects of the present invention are described more fully in the detailed description below.

BRIEF DESCRIPTION OF THE DRAWINGS

Embodiments of the present invention are described in detail below with reference to the attached drawing figures, wherein:

FIG. 8 is a perspective view of the plurality of latch fittings of FIG. 7;

FIG. 9 is a perspective view of the sliders of FIG. 6;

FIG. 10 is a cross-sectional view of the sliders of FIG. 9; and

Figure 1:
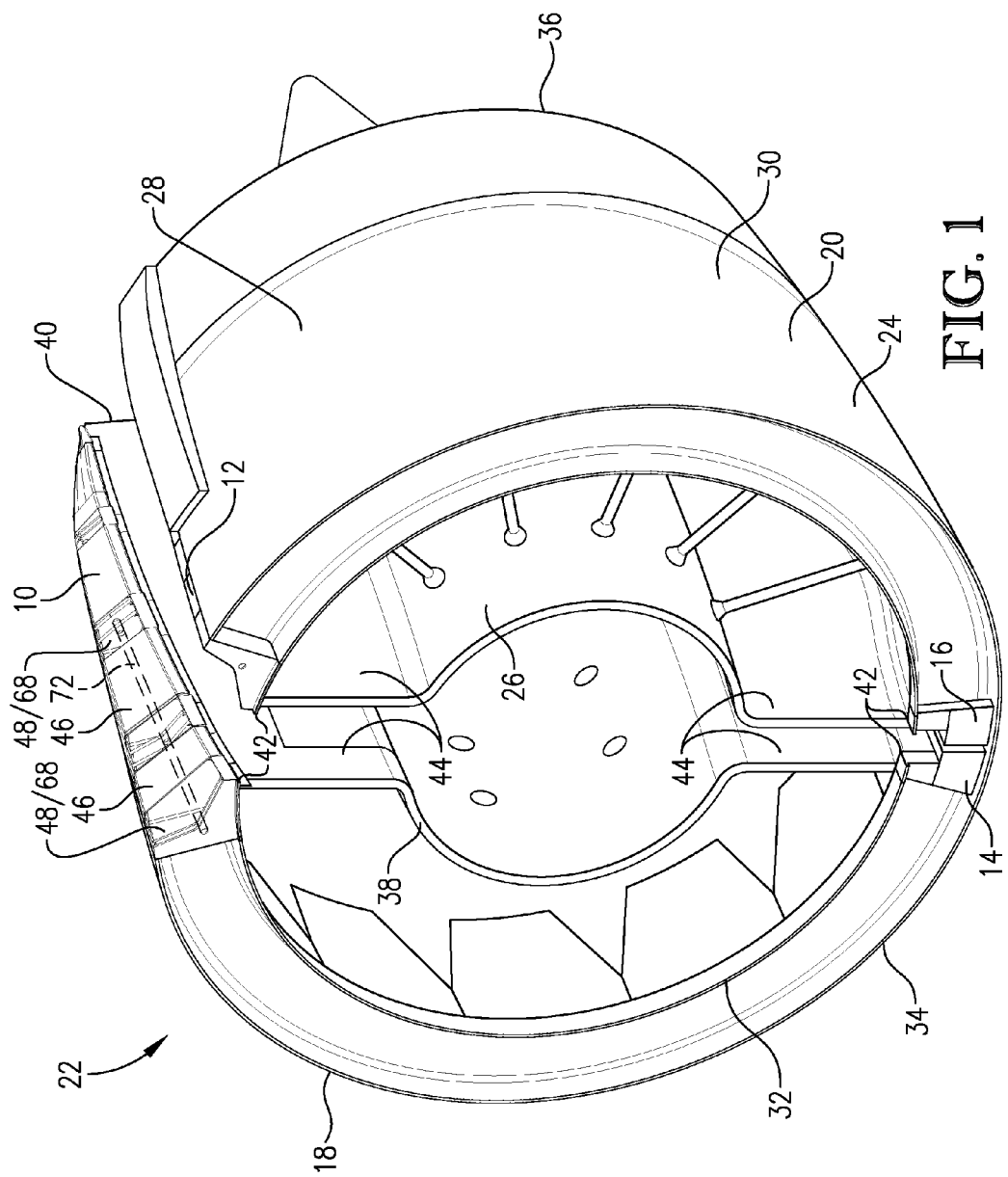
FIG. 1 is a perspective view of an aircraft thrust reverser and a plurality of hinge beams and latch beams constructed in accordance with an embodiment of the present invention.

The drawing figure does not limit the present invention to the specific embodiments disclosed and described herein. The drawing is not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIG. 1 illustrates a plurality of beams 10,12,14,16 for attaching a plurality of portions 18,20 of a thrust reverser 22 to each other and to an engine strut or pylon (not shown) of an aircraft. In one embodiment of the invention, the beams may comprise a first hinge beam 10, a second hinge beam 12, a first latch beam 14, and a second latch beam 16; however, other embodiments of the invention may include more or less beams.

The thrust reverser 22 may comprise a fan duct 24, an inner engine cowling 26, and a translating sleeve 28, each comprising a first portion 18 and a second portion 20 which together form two separate halves of the thrust reverser. Each of the first portions 18 and the second portions 20 of the thrust reverser 22 may have a substantially C-shaped cross section and may be attached to each other via the beams 10-16 to form a substantially 360-degree duct or tubular configuration around an engine and fan of the aircraft.

The fan duct 24 may comprise an outer wall 30 and an inner wall 32, a forward end 34, and an aft end 36. The outer wall 30 and inner wall 32 may each mate to form the translating sleeve 28 at the aft end 36 of the fan duct 24. Each portion 18,20 of the inner engine cowling 26 may have a forward edge 38, an aft edge 40, and two lateral edges 42 extending the length of the inner engine cowling 26 from the forward edge 38 to the aft edge 40. Each portion 18,20 of the inner engine cowling 26 may include two inner acoustic panels 44 which may be flange-like portions of the inner engine cowling 26 angled to extend substantially radially outward toward the fan duct 24 to the lateral edges 42. In this configuration, the lateral edges 42 may mate with the beams 10-16 to join the fan duct with the inner engine cowling 26.

The first and second portions 18,20 of the translating sleeve 28 may be operable to slide aft relative to the fan duct 24 for deploying the thrust reverser. The translating sleeve 28 may comprise a plurality of sliders (not shown) fixedly attached thereto for allowing the translating sleeve 28 to slide aft and forward relative the beams 10-16 to activate or deactivate reverse thrust. The sliders may comprise a main slider and an auxiliary slider (not shown).

Figure 2:
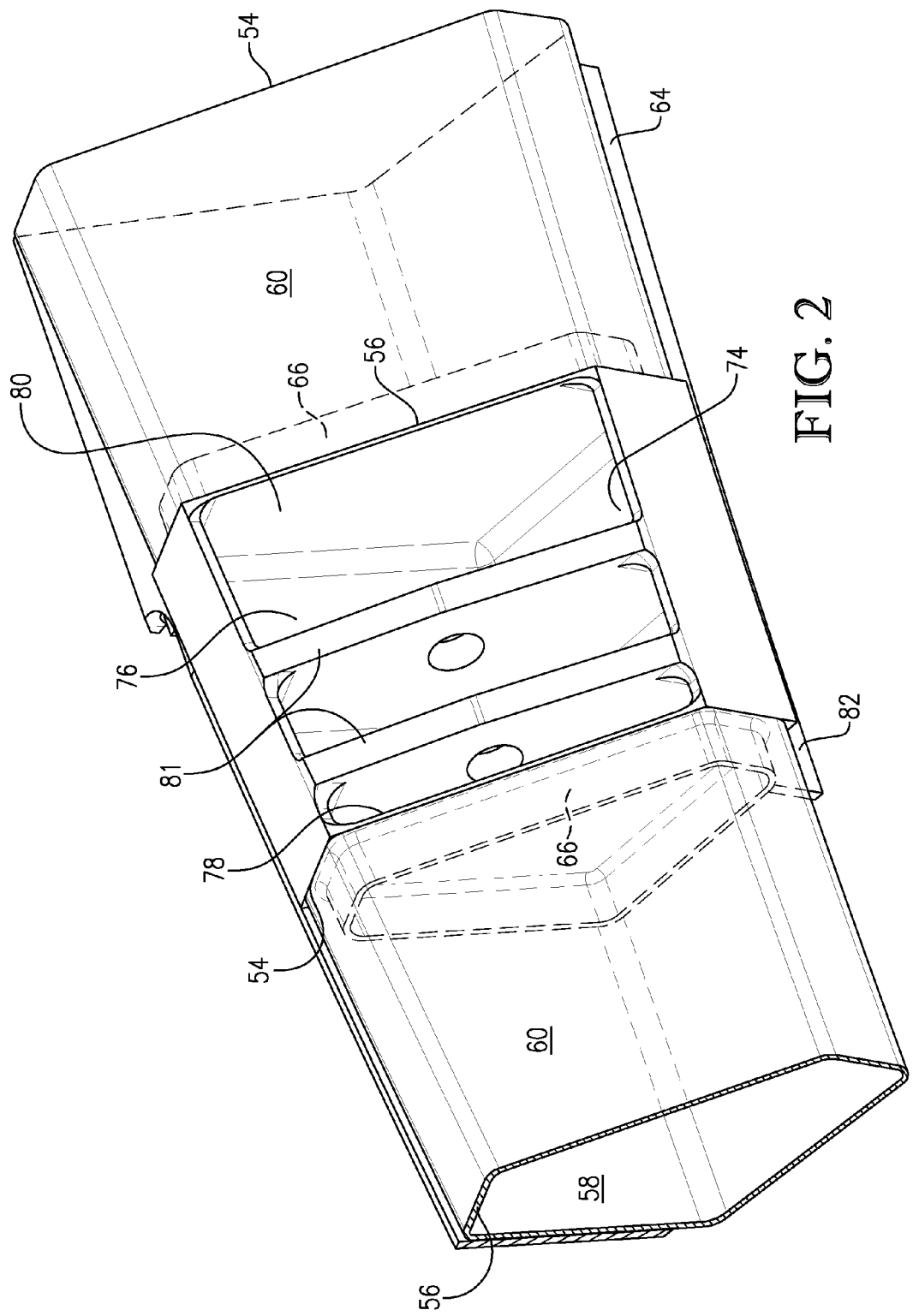
FIG. 2 is a fragmentary perspective view of one of the hinge beams of FIG. 1.
Figure 4:
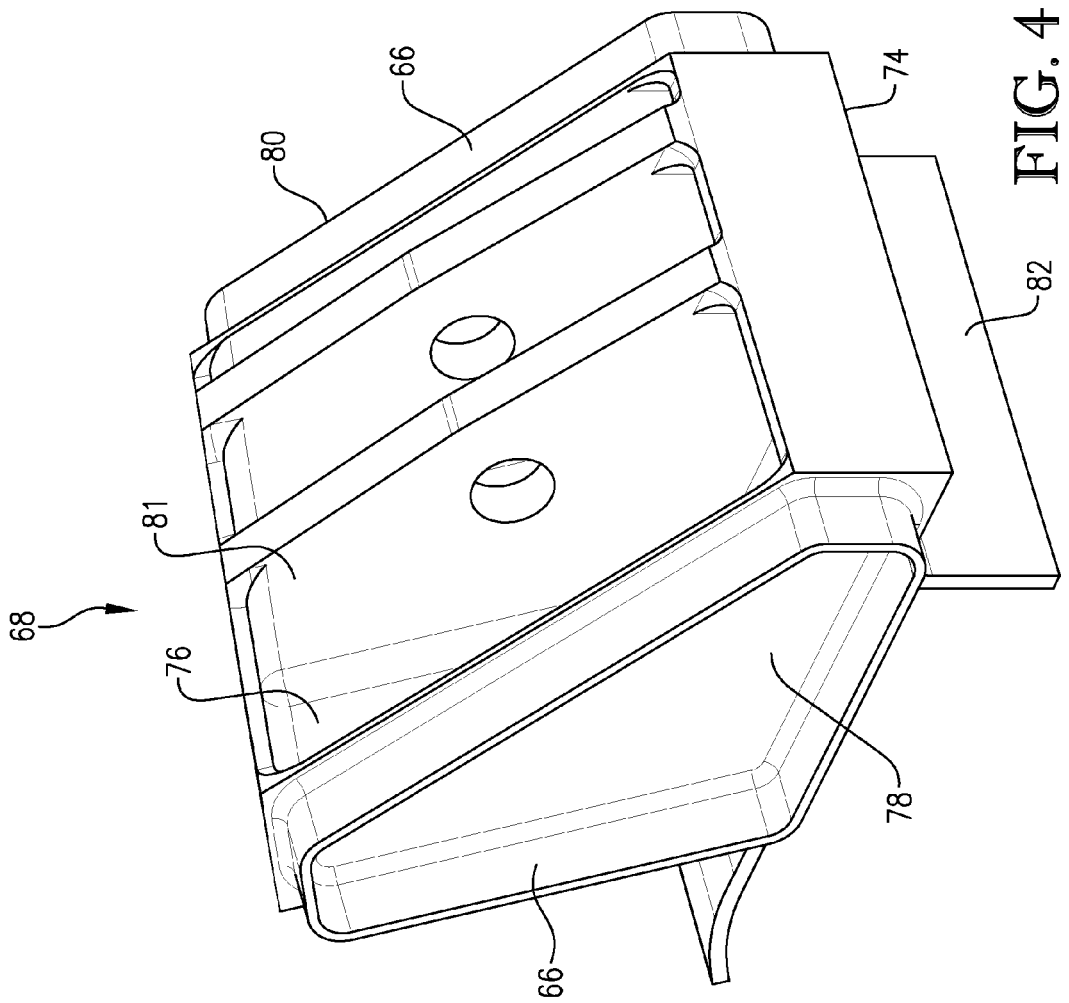
FIG. 4 is a perspective view of a hinge fitting of the hinge beam of FIG. 2.
Figure 3:
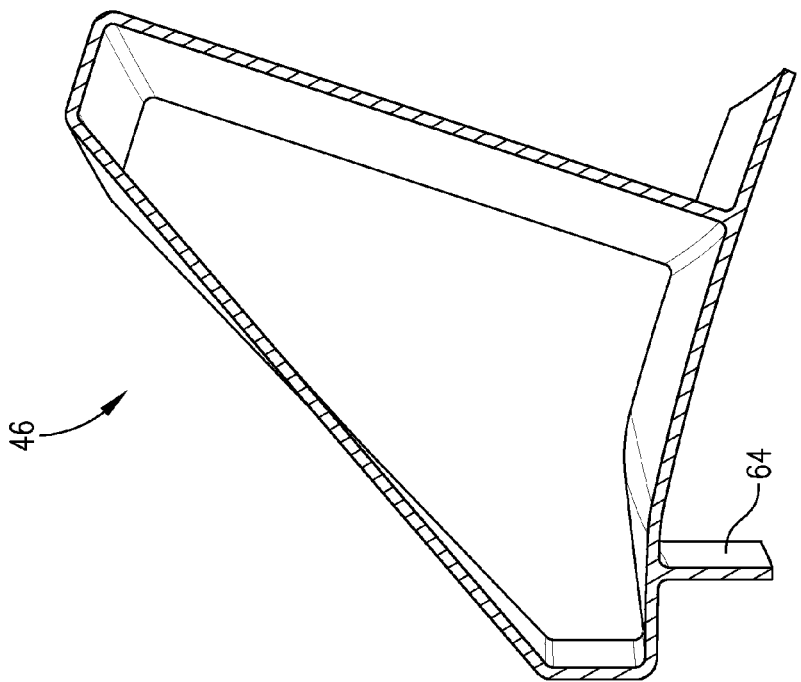
FIG. 3 is a cross-sectional perspective view of one of a plurality of composite tubes of the beams of FIG. 1.
Figure 6:
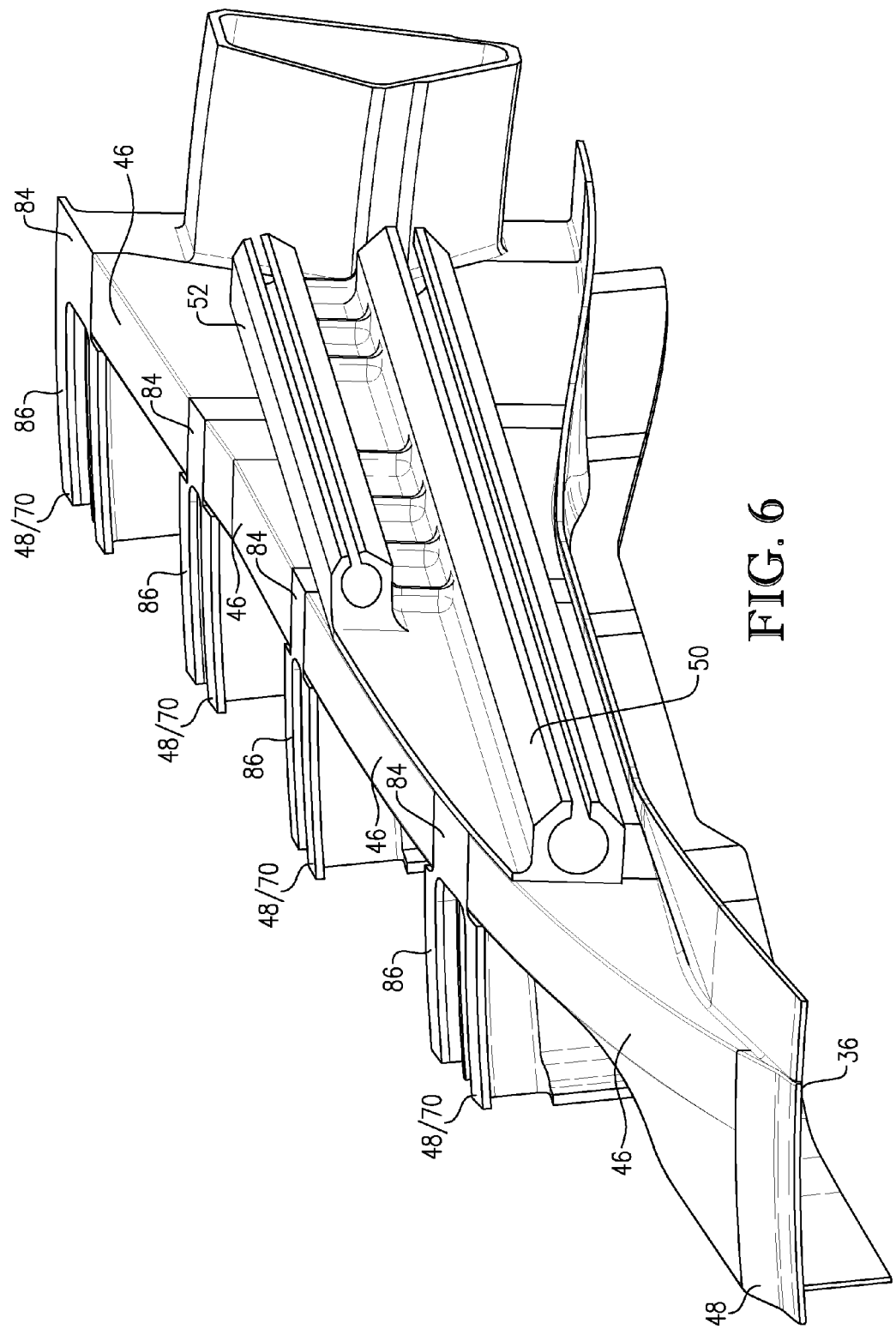
FIG. 6 is a perspective view of one of the latch beams of FIG. 1 and a pair of sliders, as viewed from an aft end.
Figure 7:
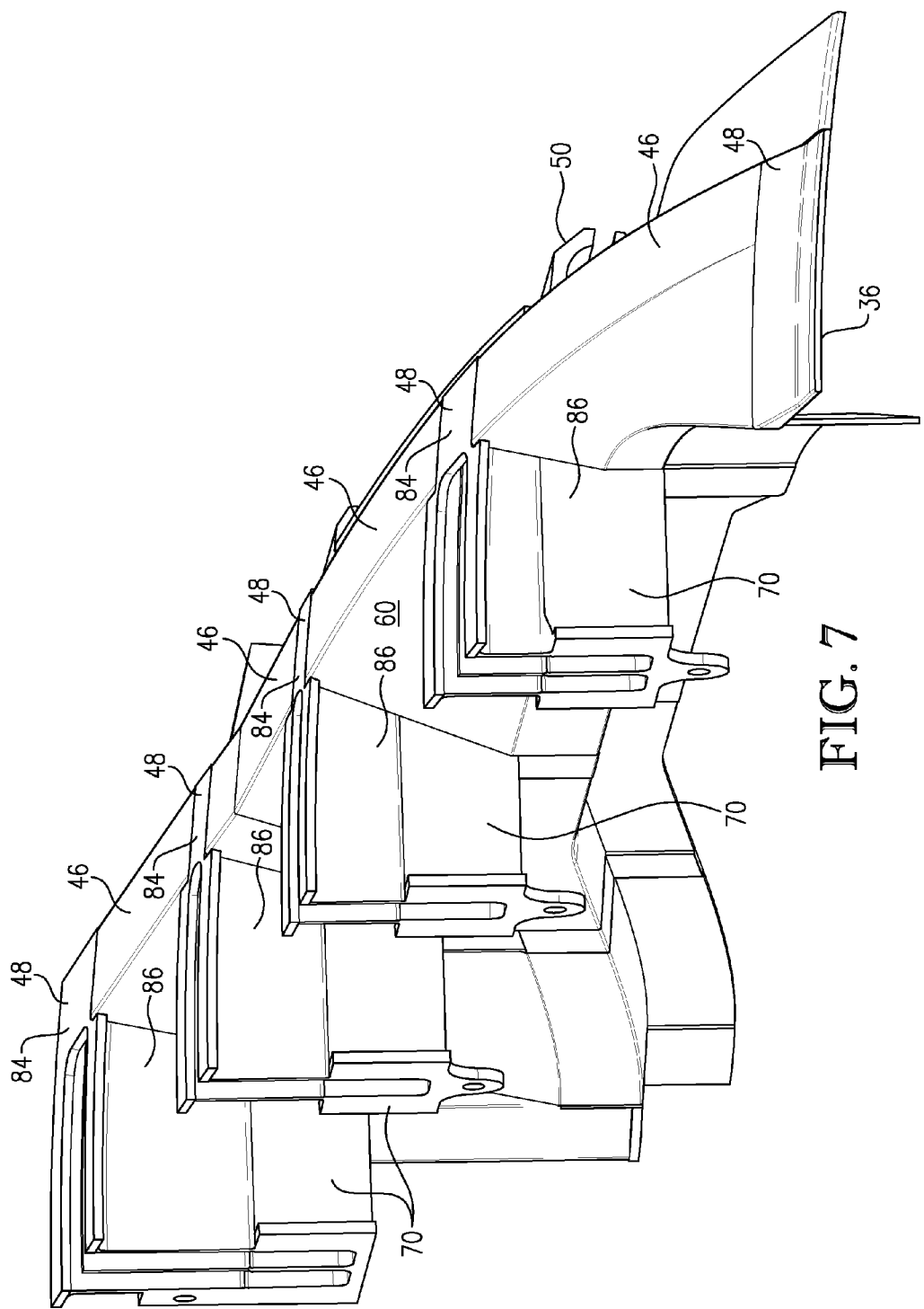
FIG. 7 is a perspective view of the latch beam of FIG. 6 and a plurality of latch fittings, as viewed from an aft end.

Each of the beams 10-16 may comprise a plurality of hollow composite tubes 46 and a plurality of metal fittings 48, as illustrated in FIGS. 2-4. The fittings may be joined in alternating succession with the composite tubes 46, such that at least one of the metal fittings 48 is sandwiched between at least two of the composite tubes 46, as illustrated in FIG. 1 and FIGS. 6-7. The beams 10-16 may also each comprise at least one slider track 50,52, as illustrated in FIG. 6 and FIGS. 9-10.

Figure 5:
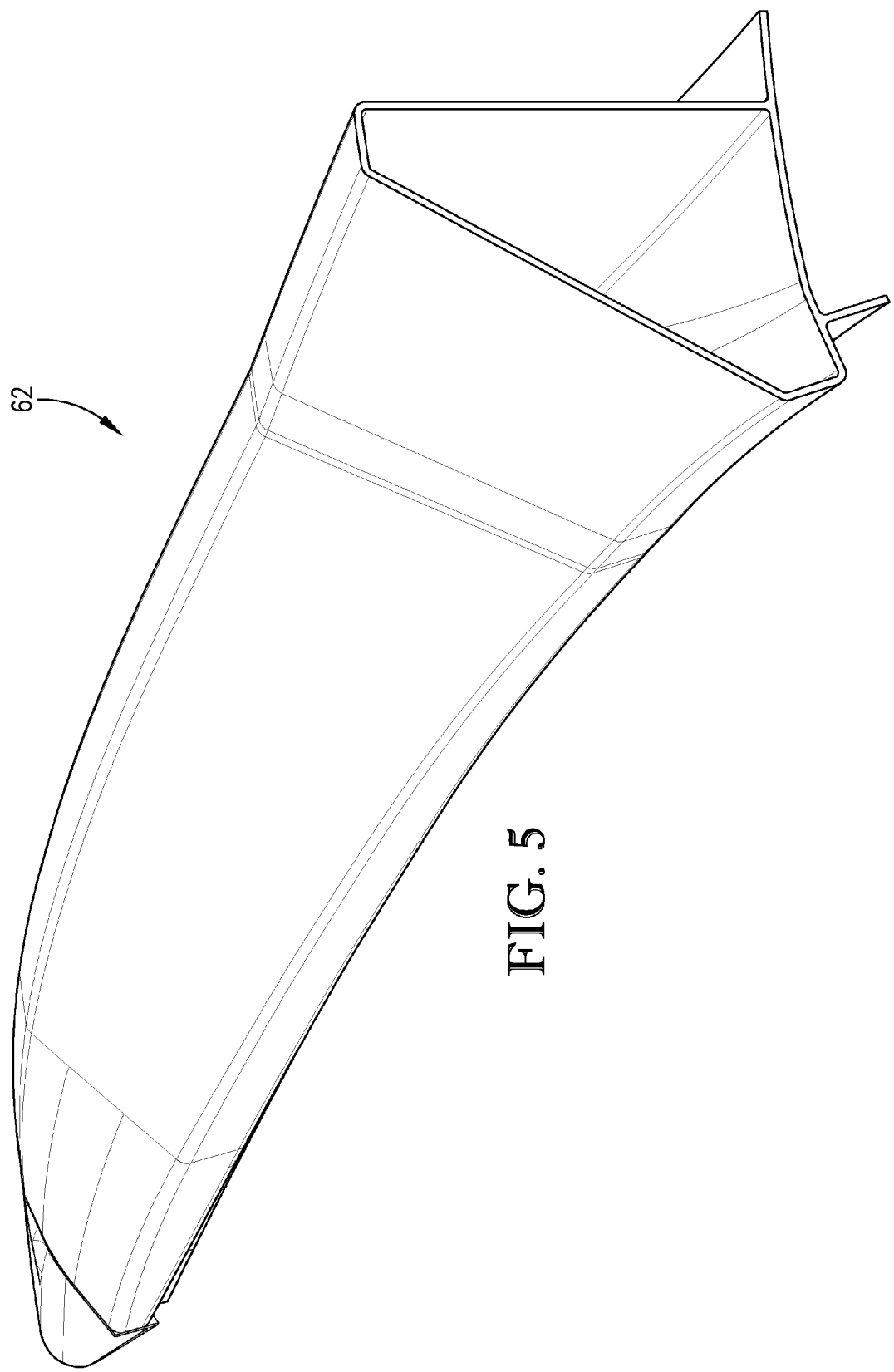
FIG. 5 is a perspective view of a long composite tube to be divided for forming the composite tube of FIG. 3.

As illustrated in FIGS. 2 & 3, the composite tubes 46 may each comprise a first end 54, a second end 56, an inner surface 58, and an outer surface 60. The composite tubes 46 may be formed by constructing one long composite tube 62, as illustrated in FIG. 5, and cutting the tube 62 into the plurality of composite tubes 46. For example, the composite tubes 46 may be formed from a an elongated composite tube 62 having a substantially triangular cross-section. At least one of the corners of the triangular cross section may be substantially rounded, squared off, or flattened in shape. The composite tubes 46 may also comprise one or more flange portions 64 integrally formed and extending from the composite tubes 46 for providing an interface for attachment to various portions of the thrust reverser 22, such as the inner acoustic panels 44 of the inner engine cowling 26.

The metal fittings 48, illustrated in FIGS. 2, 4, and 8, may be formed of a metal or metal-like material, such as machined aluminum or another light weight, durable metal, or may alternatively be made of a sufficiently strong material other than metal. The metal fittings 48 may each be sized and shaped to interface with the first and/or second ends 54,56 of at least one of the composite tubes 46. For example, the fittings 48 may have substantially triangular cross-sections substantially matching the cross-sectional size and dimensions of its adjacent composite tubes 46. Furthermore, each of the metal fittings 48 may comprise at least one interfacing portion 66 sized to at least partially slide within at least one of the composite tubes 46 and interface with and/or contact the inner surface 58 of at least one of the composite tubes 46.

The metal fittings 48, illustrated in FIGS. 1-2, 4, and 6-8 may comprise hinge fittings 68, latch fittings 70, hinge pins 72, and/or other metal fittings required for various applications. The hinge fittings 68, illustrated in FIGS. 2 and 4, may comprise a base portion 74 formed at an angle with a back portion 76, a first end wall 78 and a second end wall 80 which may be substantially parallel to the first end wall 78. The hinge fittings 68 may each have a cross section similar in shape to the cross section of the composite tubes 46. For example, the hinge fittings 68 may each have a substantially triangular cross section, including at least one substantially rounded or squared off corner. In various embodiments of the invention, there is no wall extending from an edge or corner of the base portion 74 to an edge or corner of the back portion 76, so the triangular-shaped cross section of the hinge fittings 68 may not comprise three sides, but may rather, for example, omit a hypotenuse.

Interfacing portions 66 may extend from the first and/or second end wall 78,80 to interface with the inner surface 58 of at least one of the composite tubes 46. The hinge pins 72, illustrated in FIG. 1, may extend laterally from the first end wall 78 to the second end wall 80 of each of the hinge fittings 68. Alternatively, at least one intermediate wall 81 may be integrally formed between and parallel to the first and second end walls 78,80, such that the hinge pins 72 may extend between any of the first end wall 78, the second end wall 80, and/or the intermediate walls 81.

The hinge fittings 68 and the latch fittings 70 may also comprise flange portions 82 for attaching and/or interfacing with various portions of the thrust reverser 22, such as the inner engine cowling 26. For example, one or more flange portions 82 may extend substantially perpendicularly from the base portion 74 of any or all of the hinge fittings 68 and may interface with and/or be attached to one of the inner acoustic panels 44 of the inner engine cowling 26.

The latch fittings 70, illustrated in FIGS. 6-8, may be manufactured and configured to latch and unlatch with each other or to be connected to at least one other of the latch fittings 70 via an external latching mechanism for joining a plurality of the latch fittings 70. For example, latch fittings 70 of the first latch beam 14 may be latchable with latch fittings 70 of the second latch beam 16. The latch fittings 70 may comprise the interfacing portions 66 as described above for interfacing with the inner surface 58 of at least one of the composite tubes 46.

The latch fittings 70 may comprise a beam portion 84 which may have an outer surface substantially flush with the outer surface 60 of one or more of the composite tubes 46 and a latching portion 86 which may extend outward from the beam portion 84, as illustrated in FIGS. 6-8. Any of the latching portions 86 may comprise cavities for another of the latching portions 86 to interface with and/or protrusions for interfacing with cavities of another of the latching portions 86. For example, latch fittings 70 of the first latch beam 14 may latch or interlock with latch fittings 70 of the second latch beam 16. The latch fitting 70 most proximate the forward end 34 of the fan duct 24 may be attached to an outer fixed structure, such as a torque box. The latch fitting 70 most proximate the aft end 36 of the fan duct 24 may serve as a close-out for the latch beam 14,16.

The at least one slider track 50,52, illustrated in FIGS. 6 and 9-10, may comprise a main slider track 50 and an auxiliary slider track 52. The slider tracks 50,52 may be integral with each other or may be manufactured as two separate components. The slider tracks 50,52 may be composed of the same metal as the metal fittings 48 or any other material of suitable weight and strength. For example, the slider tracks 50,52 may be fabricated from aluminum using a hot extrusion operation, defining track centerlines by a precision extrusion die or machining track centerlines after extrusion. The dimensions of the slider tracks 50,52 may correspond with the dimensions of the sliders (not shown) affixed to the translating sleeve 28, such that sliders may slidably interface with the slider tracks 50,52. Slider tracks 50,52 may be affixed to or integrated with each of the beams 10-16 on a side of the beams 10-16 opposite of the latching portions 86 or opposite of a side where an aircraft pylon or strut is rotatably attached to the hinge pins 72.

Figure 11:
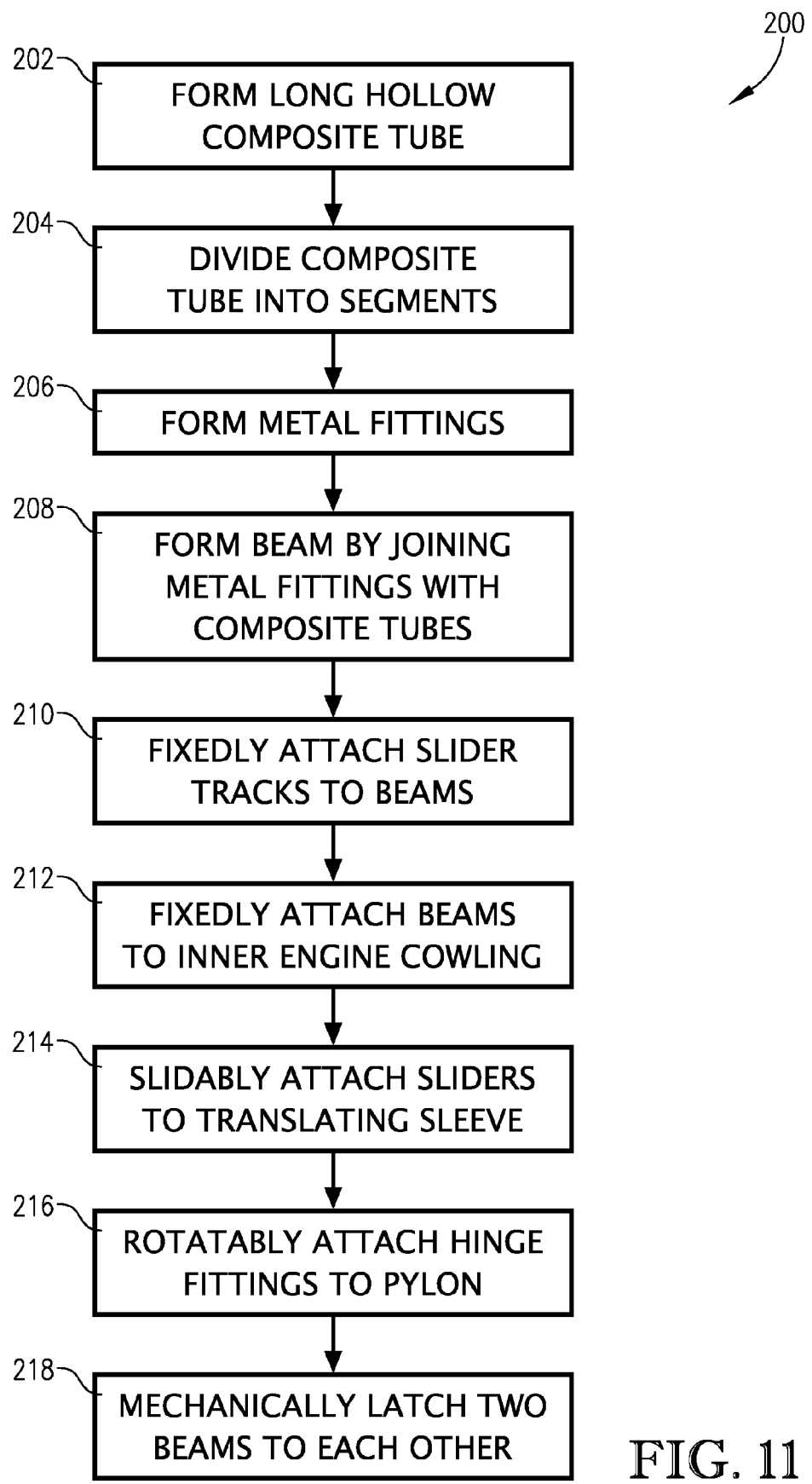
FIG. 11 is a flow chart illustrating a method of forming and installing hinge beams and latch beams.

A method 200 of manufacturing and installing any of the beams 10-16 is illustrated in FIG. 11. The method 200 may comprise forming the hollow long composite tube 62, as depicted in step 202, then cutting the long tube 62 into segments at particular intervals along its length, as depicted in step 204, to form the plurality of composite tubes 46. The method 200 may also comprise forming the metal fittings 48, as depicted in step 206. The metal fittings 48 may be formed with a 4-axis machine, or made by any manufacturing method for metal parts or their equivalent.

As depicted in step 208, the metal fittings 48 may be joined in alternating succession with the plurality of composite tubes 46 to form one of the hinge beams 10,12 or latch beams 14,16. The metal fittings 48 may be bonded to and/or mechanically fastened to the composite tubes 46 such that every other part along the length of any of the beams 10-16 is one of the composite tubes 46 and every other part along the length of any of the beams 10-16 is one of the metal fittings 48. Step 210 depicts attaching the slider tracks 50,52 to at least one of the beams 10-16. The slider tracks 50,52 may be bonded and/or mechanically fastened to the beams 10-16, or attached to the beams 10-16 using any method known in the art.

The flange portions 64,82 of the beams 10-16 may interface with and/or attach to the inner engine cowling 26, as depicted in step 212. Additionally, the beams 10-16 may be slidably attached to the sliders of the translating sleeve 28, as depicted in step 214. Specifically, the flange portions 64,82 of the beams 10,16 may attach to the acoustic panels 44. The hinge pins 72 may be fixedly attached to the hinge fittings 68 and rotatably attached with a strut or pylon (not shown) of the aircraft, as depicted in step 216. Alternatively, the hinge pins 72 may be fixedly attached to the strut or pylon of the aircraft and the hinge fittings 68 may be rotatably attached to the hinge pins 72. In either case, the hinge beams 10,12 may be slidably attached to the translating sleeve 28 of the thrust reverser 22 and rotatably attached to the pylon or strut. The latch beams 14,16 may be slidably attached to the translating sleeve 28 of the thrust reverser 22 and mechanically and detachably latched with each other, as depicted in step 218. Because the beams 10-16 are fixed with the inner engine cowling 26, each half or portion 18,20 of the inner engine cowling 26 and fan duct 24 may be rotated or pivoted open about the pylon or strut via the hinge beams 10,12 to provide access to the engine of the aircraft.

Although the invention has been described with reference to the embodiments illustrated in the attached drawings, it is noted that equivalents may be employed and substitutions made herein without departing from the scope of the invention as recited in the claims.

Having thus described an embodiment of the invention, what is claimed as new and desired to be protected by Letters Patent includes the following:

1. A hinge or latch beam for attaching a plurality of portions of a thrust reverser to each other and to an aircraft engine strut or pylon, the hinge or latch beam comprising:
    a plurality of hollow composite tubes, each composite tube having a first end, a second end, an inner surface, and an outer surface;
    a plurality of metal fittings each affixed to at least one of the composite tubes, such that at least one of the metal fittings is sandwiched between at least two of the composite tubes;
    wherein the metal fittings comprise at least one of a plurality of latch fittings and a plurality of hinge fittings operable to attach to an aircraft engine strut, a pylon, or another latch beam; and
    further comprising at least one track fixed to at least one of the composite tubes and the metal fittings and configured to slideably connect the hinge or latch beam with at least a portion of the thrust reverser.

2. The beam of claim 1, wherein the at least one track comprises a main track and an auxiliary track configured to slidably attach to a translating sleeve of a thrust reverser.

3. The beam of claim 1, wherein at least a portion of at least one of the metal fittings is positioned inward of the hollow composite tube and mates with the inner surface of at least one of the hollow composite tubes.

4. The beam of claim 1, wherein the metal fittings are joined with the composite tubes by at least one of bonding and mechanical fasteners.

5. The beam of claim 1, wherein at least a portion of the composite tubes and metal fittings comprise a flange portion configured for fixedly attaching to at least one inner acoustic panel of a thrust reverser.

6. A thrust reverser of an aircraft, the thrust reverser comprising:
    a fan duct divided into a first half and a second half, wherein each of the fan duct halves comprise an outer wall and an inner wall;
    an inner engine cowling divided into a first half and a second half, each comprising an upper acoustic panel and a lower acoustic panel extending radially outward toward the inner wall of the fan duct;
    at least one hinge or latch beam attached to at least one of the acoustic panels and at least a portion of the fan duct, the hinge or latch beam comprising:
        a plurality of hollow composite tubes, each composite tube having a first end, a second end, an inner surface, and an outer surface, and
        a plurality of metal fittings affixed to the composite tubes in an alternating configuration, such that at least one of the metal fittings is sandwiched between at least two of the composite tubes.

7. The thrust reverser of claim 6, wherein the fan duct further comprises a translating sleeve at an aft end of the fan duct, wherein the at least one beam is slidably attached to the translating sleeve.

8. The thrust reverser of claim 6, further comprising at least one of an engine strut and a pylon, wherein at least a portion of the metal fittings of the at least one beam are rotatably attached to at least one of the engine strut and the pylon.

9. The thrust reverser of claim 6, wherein the at least one beam comprises a first beam and a second beam, wherein the metal fittings of the first beam are operable to latch with the metal fittings of the second beam.

10. The thrust reverser of claim 6, wherein the metal fittings comprise at least one of a plurality of latch fittings and a plurality of hinge fittings.

11. The thrust reverser of claim 6, further comprising at least one track fixed to the at least one beam and configured to slidably connect the beam with at least a portion of the thrust reverser.

12. The thrust reverser of claim 7, further comprising a main track and an auxiliary track fixed to the at least one beam and configured to slidably attach to the translating sleeve of the thrust reverser.

13. The thrust reverser of claim 6, wherein at least a portion of at least one of the metal fittings is positioned inward of the hollow composite tube and mates with the inner surface of at least one of the hollow composite tubes.

14. The thrust reverser of claim 6, wherein the metal fittings are joined with the composite tubes by at least one of bonding and mechanical fasteners.

* * * * *